United States Patent [19]

Dickerson et al.

[11] Patent Number: 4,743,098
[45] Date of Patent: May 10, 1988

[54] TFT LC DISPLAY HAVING POLYCHROMATIC GLASS COLOR FILTERS

[75] Inventors: Jack A. Dickerson; James C. Greeson, Jr.; Charlie C. Kilmer; Neil M. Poley, all of Raleigh, N.C.

[73] Assignee: International Business Machines Corporation, Armonk, N.Y.

[21] Appl. No.: 8,021

[22] Filed: Jan. 28, 1987

Related U.S. Application Data

[63] Continuation-in-part of Ser. No. 941,460, Dec. 15, 1986, abandoned.

[51] Int. Cl.$^4$ ............................................. G02F 1/13
[52] U.S. Cl. .................. 350/339 F; 350/334; 65/30.1; 65/30.11
[58] Field of Search ............... 350/334, 339 R, 339 F; 65/30.1, 30.11; 501/57

[56] References Cited

U.S. PATENT DOCUMENTS 3,840,695 10/1974 Fischer ...................... 350/339 F X
4,057,408 11/1977 Pierson et al. .................. 65/30.1 X
4,662,720 5/1987 Fergason ...................... 350/333 X

FOREIGN PATENT DOCUMENTS 54-11698 1/1979 Japan ............................... 350/339 F Primary Examiner—Stanley D. Miller
Assistant Examiner—Richard F. Gallivan
Attorney, Agent, or Firm—Gerald R. Woods

[57] ABSTRACT

The color filters required for a thin film transistor liquid crystal display device are provided by using polychromatic glass for either the front or rear glass panel of the device. Through a series of masking, ultraviolet exposure and heat treating steps, red, green, and blue color areas can be generated in the polychromatic glass. Each of the different colored areas is, of course, to be aligned with one of the individually-addressable pel electrodes in the device. Two embodiments are described. In the first, the polychromatic glass forms the rear glass panel of the device and serves as a substrate for the thin film transistors used to individually address pel electrodes. In an alternate embodiment, the front glass panel of device is treated to form the color filter regions.

5 Claims, 3 Drawing Sheets

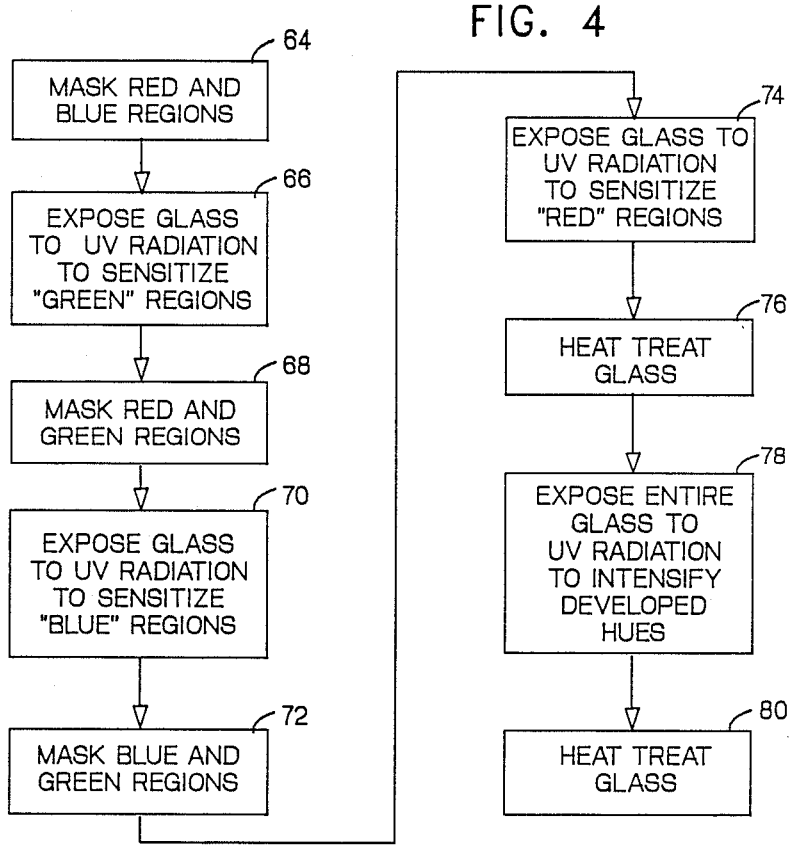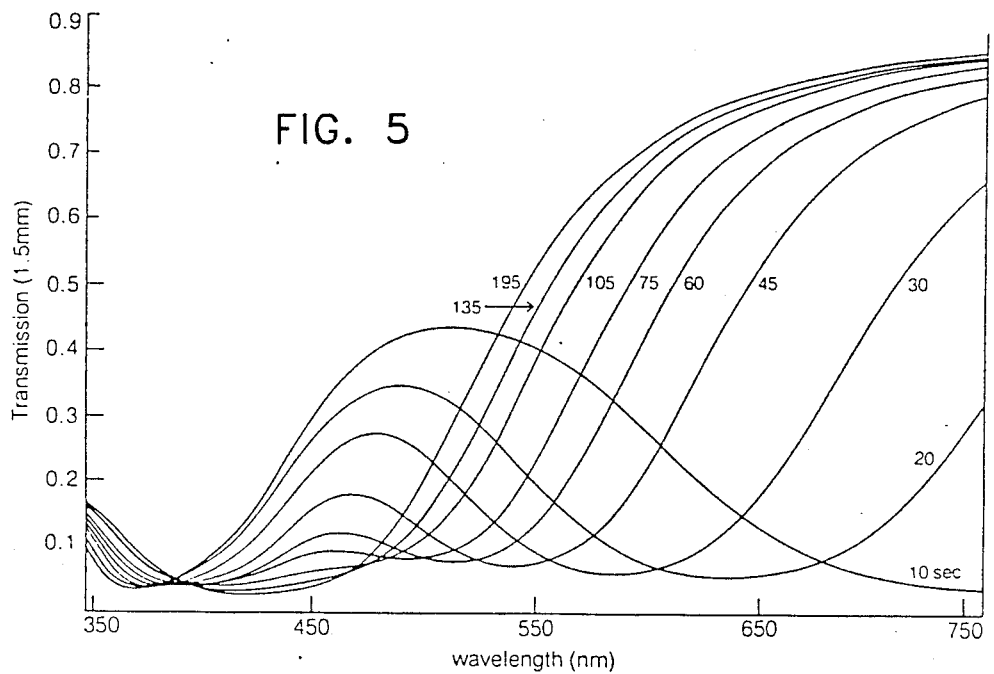

TFT LC DISPLAY HAVING POLYCHROMATIC GLASS COLOR FILTERS

CROSS REFERENCE TO RELATED APPLICATIONS

This application is a continuation-in-part of application Ser. No. 941,460, filed Dec. 15, 1986, now abandoned.

FIELD OF THE INVENTION

The present invention relates to liquid crystal display devices and more particularly to a liquid crystal color display device in which a polychromatic or full-color photosensitive glass panel has been processed to provide color filters.

DESCRIPTION OF THE PRIOR ART

Thin film transistor liquid crystal display technology is a possible successor to cathode ray tube technology for color display terminals. Liquid crystal displays with a given screen area generally occupy a smaller volume than cathode ray tube devices with the same screen area. This is considered significant commercially, since the smaller liquid crystal display had a smaller footprint; that is, occupies less area on a user's desk or terminal stand. Liquid crystal display devices may have lower power requirements than corresponding cathode ray tube devices. The operating voltages of liquid crystal devices are lower than the operating voltages of cathode ray tube devices.

While different types of color liquid crystal display devices exist, generally speaking, such devices include two spaced glass panels which define a sealed cavity filled with a liquid crystal material. A transparent common electrode is formed on one of the glass panels. Individual electrodes are formed on the other of the glass panels. Each of the individual electrodes has a surface area corresponding to the area of one picture element or pel. In the type of device contemplated by the present invention, each of the individual electrodes may be addressed by a thin film transistor. Each pel is too small to be seen by the unaided human eye. If the device is to have color capabilities, it must also include color filters with red, green and blue color areas Each color area is aligned with one of the pel-sized electrodes. Each set of red, green and blue color areas is grouped into a triad or other consistent pattern, such as repeating stripes.

Depending upon the image to be displayed, one or more of the pel electrodes is energized during display operation. Depending upon the nature of the liquid crystal material and the level of energization, the transmissivity of the liquid crystal material in the volume between the energized pel electrode and the transparent common electrode will be altered to allow full light, no light or partial light to be transmitted through the associated color filter region. The image perceived by a user is a blending of colors formed by the transmission of light through adjacent color filters.

The display may be backlighted by locating a light source on the opposite side of the display from the viewer. Alternatively, the display device may include a reflective layer at its rear surface and rely on a light source located on the same side of the display as the viewer.

Color filters for liquid crystal display devices have been formed using a number of different approaches. One approach has been to spin or deposit a light sensitized adhesive film onto the glass penel. The film is then patterned in three sequential steps. During each step, dye of a specific color (red, blue or green) is applied to predetermined regions of the film. According to another approach, organic pigments are deposited by vacuum evaporation. The filters are patterned using conventional photolithographic lift-off techniques. According to still another approach, a dyed and patterned stretched film material is used to create an internal color polarizing filter.

Each of these approaches has certain drawbacks. Most involve wet chemistry and photopatterning techniques which are relatively costly and difficult to perform with the necessary precision. Also, each creates a color filter film which is located between the transparent common electrode and the individually-addressable pel electrodes. To increase the optical density (or color intensity) or color filters made by the above-described approaches, the thickness of the color-bearing film may be increased. However, increasing the film thickness also increases the spacing between the transparent common electrode and the pel electrodes. As a consequence, the operating voltage of the device must be increased to offset the greater voltage drop through the liquid crystal layer. Further, in devices of the type described above, the color filter is removed from the viewing surface by at least the thickness of the front glass panel. If the glass panel is relatively thick, parallax can become a concern.

Still another approach uses photosensitive emulsion layers. A liquid crystal shutter device is used to sequentially exposed predetermined areas of the photosensitive emulsion layers while the layers are flooded with light having the specific color. Three differently-colored regions are formed by sequentially energizing three different groups of pel electrodes through associated thin film transistors. The latent images produced in the photosensitive emulsion layer are developed and the film is laminated to a glass substrate to form a multi-colored filter.

SUMMARY OF THE INVENTION

The present invention is a thin film transistor liquid crystal display device with color capabilities which is fabricated without the use of wet chemistry techniques or photopatterning. A device constructed in accordance with the present invention does not include a color filter layer interposed between the common electrode and the individually-addressable electrodes and therefore does not require a trade-off between color intensity and operating voltages. In fact, a device constructed in accordance with the present invention does not include a separate color filter layer at all.

The present invention is implemented in a liquid crystal display device of the type having front and rear glass panels, an array of thin film transistors which can be used to individually address associated transparent pel electrodes, a transparent common electrode and a liquid crystal material which fills the cavity defined by the pel electrode and common electrode layers on the front and rear glass panels. Such a device is improved by using polychromatic or full-color photosensitive glass to provide one of the glass panels. The glass panel is exposed and developed to provide integral color filter regions in alignment with transparent pel electrodes.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

FIG. 4 is a flow chart of the steps which must be performed to produce the color filter component;

FIG. 5 is a series of waveforms showing the response of polychromatic glass to ultraviolet energy for different exposure times.

TECHNICAL DESCRIPTION

Figure 1:
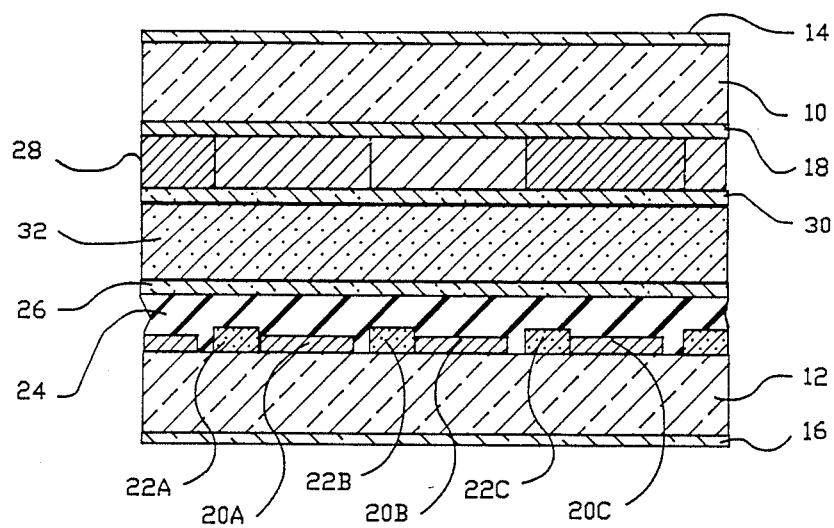
FIG. 1 is a partial cross section of a typical prior art thin film transistor liquid crystal display device having color capabilities.

FIG. 1 is a partial cross section of a typical prior art thin film transistor liquid crystal display device. The device includes a transparent front glass panel 10, a transparent rear glass panel 12, polarizing filters 14 and 16, a transparent common electrode 18 and a plurality of individually-addressable pel electrodes 20A, 20B, 20C, etc., each of which may be individually addressed or energized through an associated thin film transistor 22A, 22B, 22C, etc. The pel electrodes and the thin film transistors are deposited directly on the rear glass panel 12 using known fabrication techniques. The pel electrodes and thin film transistors are covered by a layer 24 of insulating material. The layer 24 is, in turn, covered by an alignment film 26. The prior art device includes a color filter layer 28 interposed between the transparent common electrode 18 and a second alignment film 30. The alignment films 26 and 30 define a cavity 32 filled with a liquid crystal material.

As noted earlier, the color filter layer 29 can be produced using a number of known techniques. The particular technique employed in producing the color filter 28 is not as significant as its location between the transparent common electrode 18 and the individual pel electrodes 20A, 20B, 20C, etc. Since the colored filter layer 28 is interposed between two electrode layers, increasing the thickness of layer 28 to increase optical density will necessarily increase the inter-electrode spacing. The increased inter-electrode space will require higher operating voltages. Also, since the color filter layer 28 is separated from the liquid crystal layer 32 only by the alignment film 30, the color filter material may come into contact with the liquid crystal material. The eventual result will be a degradation in the quality of colors.

Figure 2:
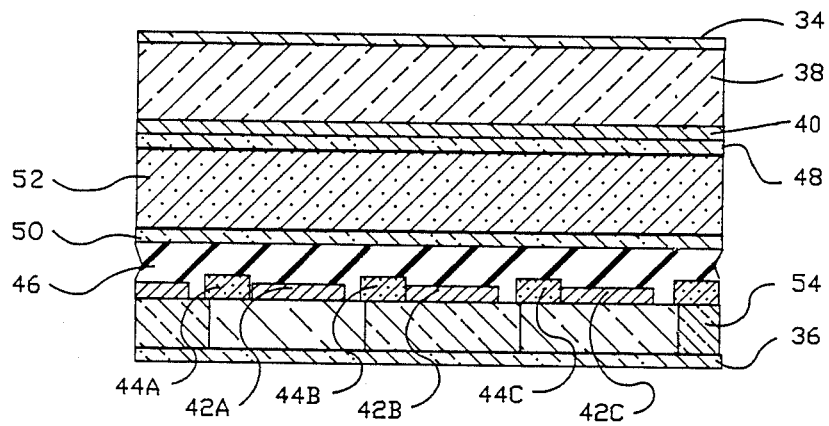
FIG. 2 is a partial cross section of a thin film transistor liquid crystal device constructed in accordance with the present invention.

FIG. 2 is a partial cross section of a thin film transistor liquid crystal display constructed in accordance with the present invention. Many of the components of this display perform the same functions as corresponding components in the prior art display. For example, the device shown in FIG. 2 includes polarizing filters 34 and 36, a front glass panel 38, a transparent common electrode 40, individually addressable pel electrodes 42A, 42B, 42C, respectively, each of which may be individually energized through an associated thin film transistor 44A, 44B, 44C, etc. The display device further includes a layer 46 of insulating material deposited upon the pel electrodes thin film transistors, alignment films 48 and 50 and a volume 52 of liquid crystal material. All of these components perform the same basic function as they do in prior art devices.

The device shown in FIG. 2 does not, however, include a separate, dedicated color filter layer, such as layer 28 of the prior art device illustrated in FIG. 1. Referring again to FIG. 2, the color filters are provided by using a full-color sensitive or polychromatic glass for the rear glass panel 54.

Polychromatic glass is a commercially available glass material which can be processed using ultraviolet radiation and heat to form colored regions which, depending on the parameters of the process, may be confined to an area near the surface of the glass or may extend entirely through the glass. Additional information about polychromatic glass and the steps required to process it to form the colored regions will be provided with reference to a later figure. It should be noted here that the use of polychromatic glass eliminates the need for a separate color filter layer in the region between the common electrode and the individually addressable pel electrodes. The spacing between the electrode layers can be reduced relative to the prior art spacing to reduce the operating voltage required. It should also be noted that the color filter layer is actually part of the substrate on which the pel electrodes are deposited. In view of the closed proximity of the pel electrodes and the color filter layer, parallax is not a problem.

Figure 3:
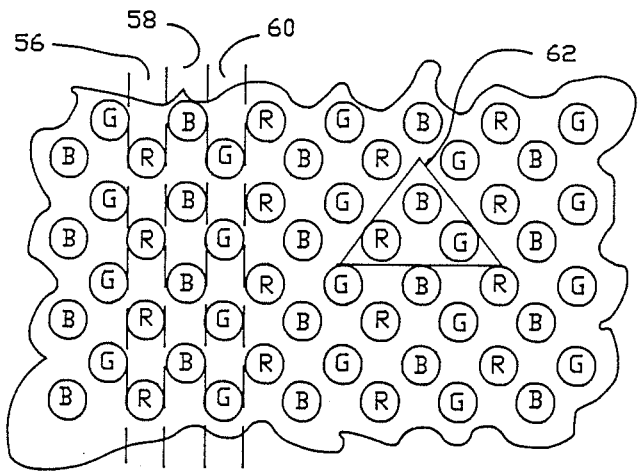
FIG. 3 is an enlarged view of a color filter component for the device shown in FIG. 2.

FIG. 3 is a plan view of the polychromatic glass panel 54 after the colored filter regions have been formed by the method to be described. The glass panel includes adjoining columns of red pels 56, blue pels 58 and green pels 60.

The color of each point in an image to be displayed is controlled by adjusting the amount of light transmitted through a set or triad 62 consisting of a red pel, a blue pel and a green pel. For example, if the image point is to be pure red, the thin film transistor associated with the red pel in triad 62 is energized to cause a liquid crystal material aligned with the red pel to become transparent. The liquid crystal material aligned with the blue and green pels would remain opaque. As another example, if magneta were to be displayed, the thin film transistors associated with both and red and blue pels would be energized to allow only red and blue light to pass through the color filter.

The process for forming the color filter regions in a sheet of unexposed, initially-transparent polychromatic glass is described with reference to FIG. 4.

Polychromatic glass is a full-color photosensitive glass developed and marketed by Corning Glass Co. Properties of the glass and methods for achieving a range of colors are described in U.S. Pat. Nos. 4,017,318 and 4,057,408 and in an article entitled, "Full-Color Photosensitive Glass," appearing at pages 5114–5122 of the Journal of Applied Physics, 49(10), October, 1978. The color which is to be produced in a given region of polychromatic glass is determined by the length of time to which the glass is exposed to ultraviolet radiation although the exposure step itself does not produce actual hues. The ultraviolet exposure must be followed by a heat treatment step which generates hues in areas sensitized by the exposure step. The intensity or saturation of the color in the exposed region can be increased by a second exposure to ultraviolet radiation either simultaneous with or followed by a second heat treatment.

Referring to FIG. 4, the formation of color filter regions in the polychromatic glass can involve three successive masking steps and four ultraviolet exposure steps. The masks employed are preferably high resolution masks such as chrome on quartz. In the first step 64 of the process, the red and blue regions of the polychromatic glass are masked, while the regions in which a green hue is to be developed are left unmasked. The glass panel is exposed to ultraviolet radiation (step 66) to sensitize the glass in the unmasked areas. In the second masking step, a different mask is used in step 68 to mask or block those regions of the glass panel which are to provide red and green colors. The glass panel is again exposed (step 70) to ultraviolet radiation to sensitize other, previously masked regions. In the final masking step 72, the blue and green regions of the glass panel are masked before the panel is exposed to ultraviolet radiation (step 74) to develop to sensitize the glass in areas which had remained masked during preceding exposures. To generate red, green and blue hues in the sensitized regions, the entire glass panel is heat treated (step 76) in a suitable oven. The glass is heated to a temperature on the order of 500° C. for a time period on the order of forty-five minutes.

Referring briefly to FIG. 5, the light transmission curves for fully developed polychromatic glass is shown for various first exposure times, assuming a following heat treatment step. The waveforms show that the transmissivity of the glass after an initial exposure of ten seconds is greatest at a wavelength on the order of 475 nanometers, which is the approximate wavelength of the color green. The transmissivity of the glass peaks at the wavelength of the colors blue and red after initial exposures of 30 seconds and 105 seconds.

To intensify or saturate the colors generated by the initial exposure and heat treatment step, the entire glass panel is exposed (step 78) to a second dose of ultraviolet radiation. The length of the second exposure step is determined by the degree of saturation desired. If the second exposure is carried out at room temperature, it must be followed by a second heat treatment (step 80) at temperatures in a range of 400 to 450 degrees centigrade for about fifteen minutes.

It is possible to perform the second ultraviolet exposure step simultaneously with the heat treatment step. If that is done, the heat treatment step can be performed at temperatures on the order of 350° C. The colors normally reach full intensity or saturation in less than an hour after the second exposure and heat treatment.

Once the colors have been produced using the steps described above, the colors remain permanently within the glass and are not degraded by further ultraviolet exposure or further heat treatment unless the heat exceeds 400°–450° C. At temperatures exceeding these temperatures, atomic diffusion can occur and the colors within the glass will deteriorate towards brown or yellow.

Figure 6:
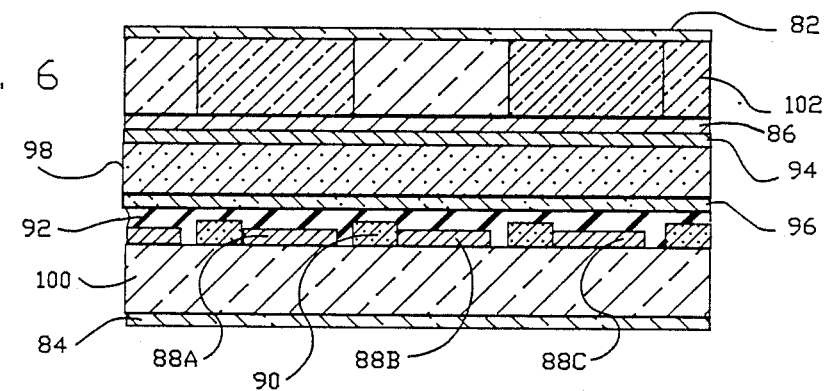
FIG. 6 is a partial cross section of an alternate embodiment for a thin film transistor liquid crystal display device also constructed in accordance with the present invention.

While the advantages of using polychromatic glass to form the color filter region are maximized by the embodiment described with reference to FIG. 2, certain advantages are retained if the front glass panel is polychromatic glass while the rear glass panel remains conventional, transparent glass. FIG. 6 shows this alternate embodiment. The assembly continues to include polarizing filters 82 and 84, a transparent common electrode 86, individual pel electrodes 88A, 88B, 88C, etc., each being controlled by an associated thin film transistor such as transistor 90, an insulating layer 92, alignment films 94 and 96 and liquid crystal material 98. The difference between the embodiment shown in FIG. 2 and the embodiment shown in FIG. 6 is that FIG. 6 employs a conventional transparent glass panel 100 as the rear glass panel and a polychromatic color filter panel 102 as the front glass panel of the assembly. The glass panel 102 would be formed using the steps described with reference to FIG. 4.

While there have been described what are considered to be preferred embodiments of the present invention, variations and modifications in those embodiments will occur to those skilled in the art once they learn the basic concepts of the invention. Therefore, it is intended that the appended claims shall be construed to include both the preferred embodiments and all such variations and modifications as fall within the true spirit and scope of the invention.

What is claimed is:

1. In a liquid crystal display device of the type having front and rear glass panels, an array of thin film transistors with associated transparent pel electrodes, a transparent electrode layer and a liquid crystal material interposed between the pel electrodes and the transparent electrode layer, the improvement comprising the use of polychromatic glass in one of the glass panels, said glass having been exposed and developed to provide integral color filter regions aligned with the transparent pel electrodes.

2. An improved liquid crystal display device as defined in claim 1 wherein the integral color filter regions are grouped into repetitive patterns of red, green and blue colors.

3. An improved liquid crystal display device as defined in claim 2 wherein said polychromatic glass forms the front glass panel, said display device being illuminated from a soure behind the rear glass panel.

4. An improved liquid crystal display device as defined in claim 2 further including a reflective layer adjacent the rear glass panel.

5. An improved liquid crystal display device as defined in claim 4 wherein the polychromatic glass forms the rear glass panel.

* * * * *